US000001088H

United States Statutory Invention Registration [19]

[11] Reg. Number: H1088

Marks

[43] Published: Aug. 4, 1992

[54] PROCESS FOR INSTALLING LINER IN PRESSURE VESSEL

[75] Inventor: John D. Marks, Salt Lake City, Utah

[73] Assignee: Hercules Incorporated, Wilmington, Del.

[21] Appl. No.: 701,321

[22] Filed: May 6, 1991

Related U.S. Application Data

[63] Continuation of Ser. No. 165,408, Feb. 26, 1988, abandoned, which is a continuation of Ser. No. 851,988, Apr. 14, 1986, abandoned, which is a continuation-in-part of Ser. No. 378,588, May 17, 1982, Pat. No. 4,596,619.

[51] Int. Cl.[5] ..... B32B 31/04

[52] U.S. Cl. ..... 156/173; 156/244.11; 156/293; 156/294; 156/423

[58] Field of Search ..... 156/155, 156, 172, 173, 156/244.11, 287, 293, 294, 423

[56] References Cited

U.S. PATENT DOCUMENTS

| | | | |
|---|---|---|---|
| 3,026,223 | 3/1962 | Vanderbilt et al. | 156/190 |
| 3,303,079 | 2/1967 | Carter | 156/173 |
| 3,367,817 | 2/1968 | Bluck | 156/446 |
| 3,449,182 | 6/1969 | Wiltshire | 156/172 |
| 4,104,098 | 8/1978 | Hush et al. | 156/172 |
| 4,348,247 | 9/1982 | Loyd et al. | 156/156 |
| 4,507,165 | 3/1985 | Herring | 156/287 |

*Primary Examiner*—Brooks H. Hunt
*Assistant Examiner*—Daniel Jenkins
*Attorney, Agent, or Firm*—Edmund C. Ross, Jr.; Mark D. Kuller

[57] ABSTRACT

A process is disclosed for installing an elastomeric liner in a pressure vessel. The process comprises winding a tacky ribbon around an expandable mandrel, inserting it in the vessel shell, expanding the mandrel and optionally curing the wound ribbon.

9 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

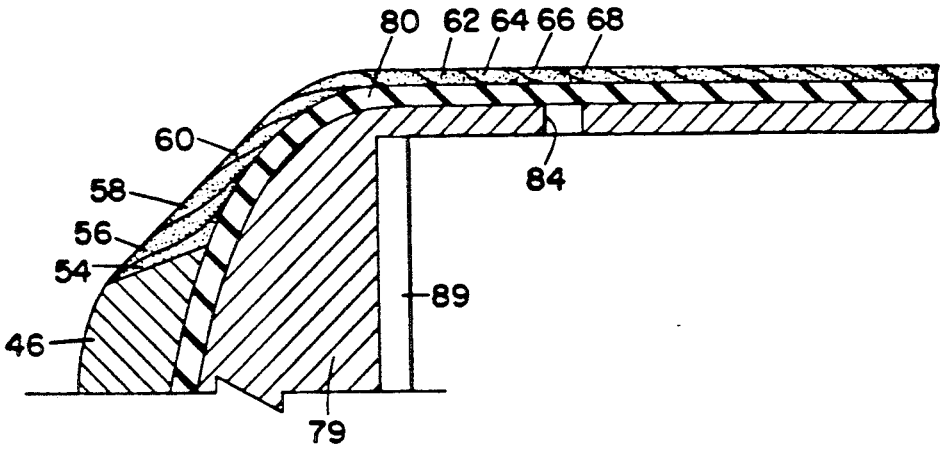
FIG. 3
FIG. 4
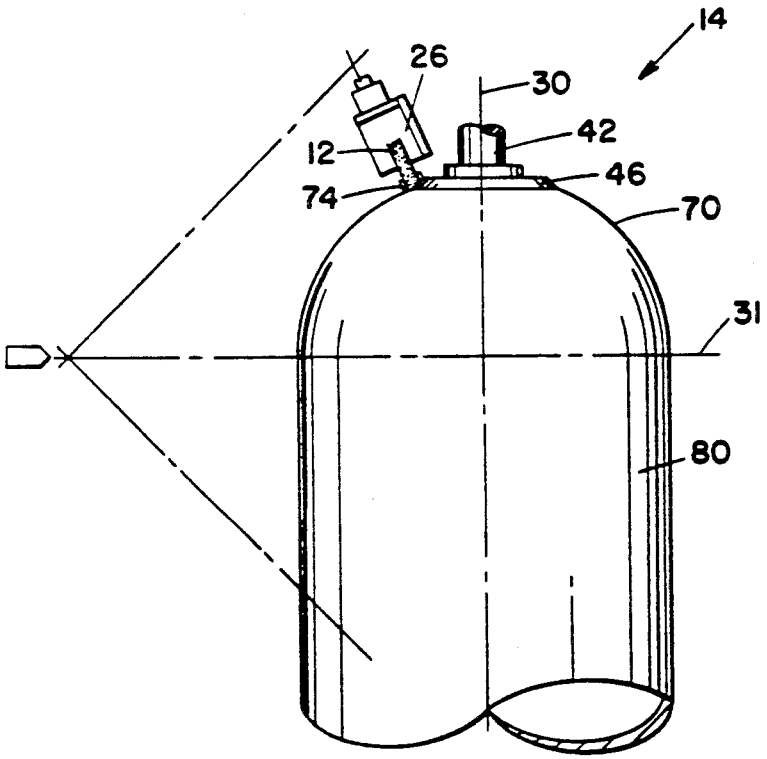
FIG. 5
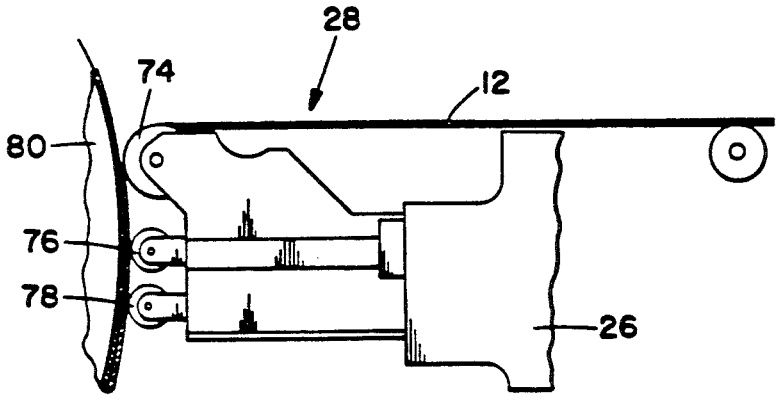

PROCESS FOR INSTALLING LINER IN PRESSURE VESSEL

This application is a continuation of application Ser. No. 07/165,408, filed Feb. 26, 1988; abandoned which is a continuation of Ser. No. 06/851,988, filed Apr. 14, 1986; abandoned, which is a continuation-in-part of Ser. No. 06/378,588, filed May 17, 1982, now U.S. Pat. No. 4,596,619, issued Jun. 24, 1986.

A process is disclosed for installing an elastomeric liner in a pressure vessel. The process comprises winding a tacky ribbon around an expandable mandrel, inserting it in the vessel shell, expanding the mandrel and optionally curing the wound ribbon.

BACKGROUND OF THE INVENTION

1. Field of Use

This invention relates to fabricating containment vessels such as rocket motor cases that have an internal lining comprising elastomer. This invention, more specifically, relates to a method of fabricating these elastomer lined vessels where a tacky ribbon comprising cured or curable elastomer is used in providing the liner on the inside of a previously made composite or metal structural shell of the containment vessel.

2. Prior Art

The elastomeric liner of containment vessels performs such functions as a sealant to (a) retain the fluid contents, (b) prevent contamination of the contents from external sources, and (c) protect the composite or metal structural body from chemical or thermal degradation. For example, where the vessel is a rocket motor case, either composite or metal, the elastomeric liner serves the major function of thermally insulating the case from the hot combustion gases of the burning rocket fuel. For rocket motor cases, two present methods of insulator manufacture are (1) the molding of green rubber stock in matched metal dies and (2) the hand lay-up of green rubber sheets followed by vulcanization and grinding to final dimensions. In either circumstance, insulators for composite cases are next positioned on case winding mandrels, or for a preformed case, formed within it, where various splicing, hand buffing, bonding and shrinking operations are performed.

For very large rocket motors using either metal or composite as the structural body and in which the insulator is positioned within the preformed case, special care must be exercised prior to vulcanizing to prevent the elastomer from debonding from the "ceiling"]side of the case, falling to the "floor" with loss of significant monies, and possibly causing major injury or death.

For small rocket motor cases (typically 5 cm to 50 cm diameter) one method of insulator manufacture is the hand lay-up of green rubber sheets on a metal mandrel with an expandable cured elastomeric skin. The mandrel is inserted into the case, then the elastomeric skin is expanded to force the green rubber insulator into contact with the case wall where it is retained during vulcanization.

These methods of fabrication are disadvantageous in view of the need for: a) large facility investments, b) extensive precision tooling, c) long lead times for production that give rise to an inability to accommodate design changes quickly and cheaply, and d) labor intensive unit costs.

U.S. Pat. No. 3,303,079 relates to preparation of elastomer lined rocket motor cases. This patent proposes laying calendared sheets of rubber on a mandrel to produce an elastomer precursor layer to the liner. The elastomer layer is encased in a resin and filament wound shell and the resin and elastomer cured together in providing the elastomer lined composite vessel. Laying calendared sheets manually about a mandrel, however, is labor intensive; and it is especially difficult when building thickness with more than two sheets of the elastomer and when covering contoured portions of the mandrel with precise, but variable thicknesses.

This application is a continuation in part of U.S. patent application Ser. No. 378,588, filed May 17, 1982, now U.S. Pat. No. 4,596,619.

OBJECTS OF THE INVENTION

It is an object of this invention to provide containment vessels comprising a metal or composite structural shell lined on the inside with elastomer.

It is an object to provide an improved method of lining these vessels starting from a previously formed metal or composite structural body or shell.

It is an object of this invention to provide such a method that readily produces an elastomer liner in rocket motor cases and other such vessels with more unfinished dimensional precision of the elastomer than has been accomplished in the prior art.

It is an object of this invention to build a containment vessel liner of required, but variable, precise thickness directly on an expandable mandrel without a requirement for (i) matched metal dies constrained within a press for vulcanization, or (ii) hand lay-up and autoclave vulcanization and grinding to final dimension, or (iii) assembly of the parts on the mandrel and bonding thereof.

It is an object of this invention to permit the fabrication of a first article elastomer liner of composite or metal vessels such as rocket motor cases in a significantly more rapid manner than is the current state of the art, with a further object to significantly reduce production time of subsequent articles.

These objects are accomplished in accordance with this invention; they are more completely described in the following along with how they and other objects are achievable.

SUMMARY OF THE INVENTION

The method of this invention provides a liner for containment vessels such as rocket motor cases, pipes, chemical reactors, gaseous or liquid fuel confinement tanks and the like. The liner comprises elastomer which may contain organic and inorganic fillers and reinforcement. The structural body or shell of the containment vessel comprises composite material, metal, or a combination of metal and composite.

The method includes causing a tacky ribbon comprising the elastomer to encircle a mandrel rotational axis. The mandrel is expandable and configured for insertion into the vessel structural shell. Depending on factors such as the relative configuration of the mandrel portion being encircled by the ribbon and the desired configuration of the liner, the ribbon lays on its edge or flatly against the mandrel surface. Adjacently positioned segments of the ribbon on the mandrel tack together. The tacking is substantially circumferential relative to the rotational axis of the mandrel. A continuous layer of elastomer is formed from laying the ribbon on the mandrel in the aforementioned manner.

In a first embodiment, the mandrel with the deposited elastomer is positioned accurately inside the vessel shell, the mandrel expansion mechanism is actuated so that the elastomer contacts the interior wall of the vessel and the elastomer is vulcanized and adhered to the vessel wall. Vulcanization can take place by placing the assembly in an oven, or by internally heating the mandrel, or by using room-temperature- vulcanizing elastomer The presence of release material can prevent bonding at selected locations.

In a second embodiment, the layer of elastomer is cured prior to installation in the vessel shell or shell segment. In this second embodiment, a ribbon of uncured elastomer is similarly layed on the mandrel but then cured in an autoclave, or more preferably, first overwrapped or encased with sacrificial material which is removed after curing of the elastomer in an oven or by microwave. The sacrificial material can be release tape, dry fiber, shrink tape, or a combination thereof. An adhesive is applied to selected surfaces of the cured elastomer and/or the interior wall of the vessel, the mandrel positioned in the shell, and the mandrel expansion mechanism actuated. The adhesive bond is then cured in accordance with the adhesive reactivity so as to provide the elastomer lined containment vessel.

Accordingly, in practice of either the first or second embodiment this invention comprises preparing an elastomer lined containment vessel such as a rocket motor case by steps including: providing means for issuing a thin ribbon comprising a curable elastomer, the ribbon adapted or adaptable to adhere to itself; providing an applicator for applying the ribbon to an expandable mandrel having a center axis of rotation, the mandrel configured to a shape for inserting within the vessel shell or portion thereof; fixing the ribbon relative to a first surface portion of the mandrel causing relative rotation between the mandrel and the applicator about the center axis while issuing the ribbon to the applicator at a rate sufficient for applying the ribbon to the mandrel substantially circumferentially about such center axis starting from the first surface portion of the mandrel; continuing together the relative rotation about the center axis to lay substantially circumferentially disposed segments of the ribbon adjacently about the mandrel that adhere together in forming a layer of the curable elastomer that covers the mandrel; inserting the mandrel having such layer of elastomer into the vessel shell; expanding the mandrel to provide contact between the vessel shell and layer of elastomer; collapsing the mandrel so as to part the elastomer layer and the mandrel; and removing the collapsed mandrel from the vessel shell. Curing of the elastomer is preferably in accordance with the first embodiment such that the vessel shell and mandrel press together on the layer of elastomer as it is being cured.

In making certain vessels that are used as rocket motor cases, the mandrel shape can include a dome-like shape; an uncured or cured elastomer ring or dome shape can be positioned at the apex of the dome-like mandrel and used as the aforementioned starting surface portion of the mandrel.

BRIEF DESCRIPTION OF THE DRAWINGS

FIG. 3 depicts schematically a portion of the liner of FIG. 2 in order to illustrate a pattern in which the ribbon is layed in forming the liner.

FIG. 4 depicts schematically positioning of an applicator applying ribbon to a dome-shaped mandrel section using this invention.

FIG. 5 is a view of an applicator applying a ribbon of elastomer to another portion of the dome section of the mandrel used in making a rocket motor case.

DETAILED DESCRIPTION OF PREFERRED EMBODIMENTS OF THE INVENTION

Figure 1:
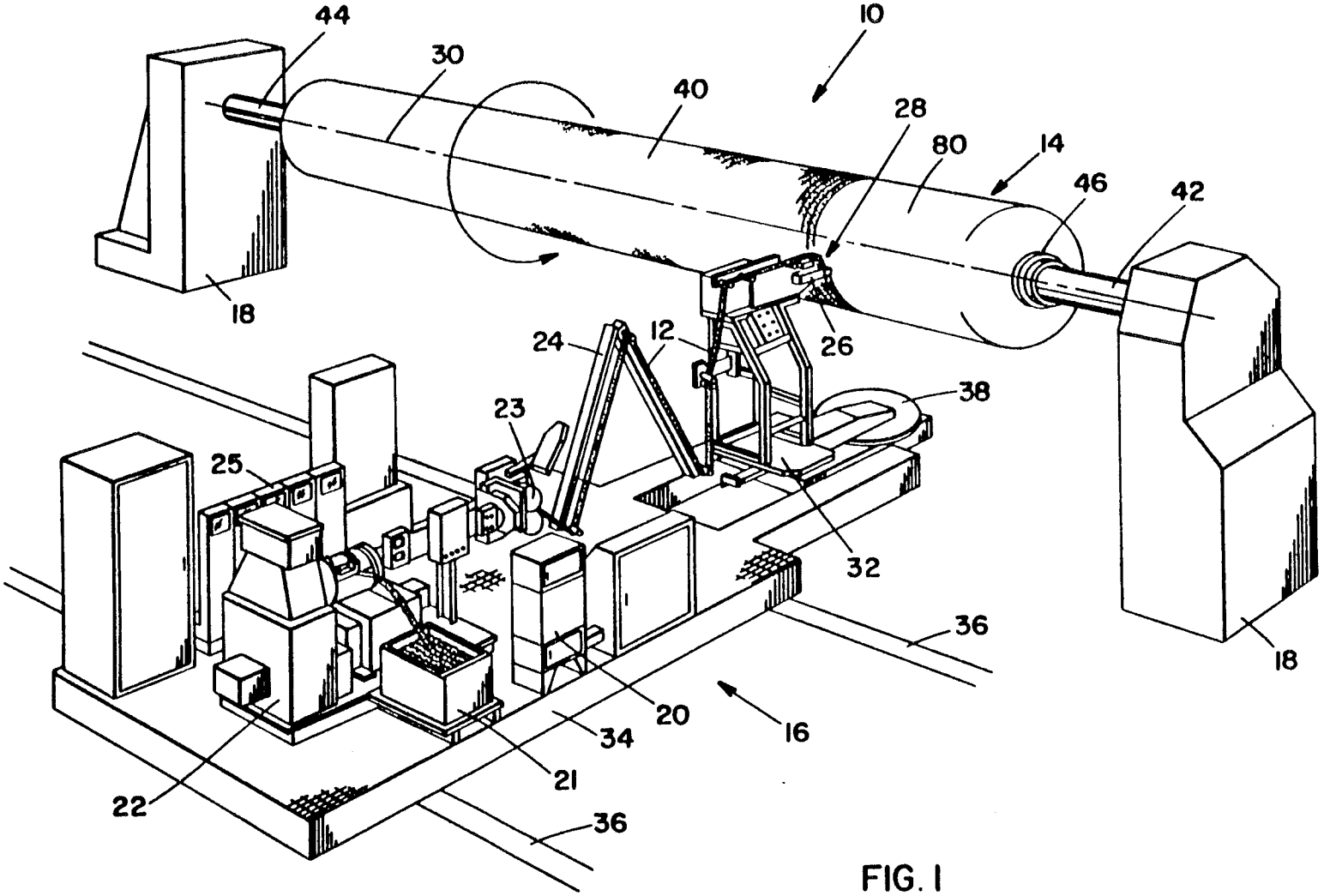
FIG. 1 schematically depicts in perspective an apparatus useful in practicing this invention.

Apparatus 10 depicted in FIG. 1 preferably is used for fabricating the elastomer liner of a rocket motor case in a practice of either of the first and second embodiments of this invention. Apparatus 10 provides continuous tacky ribbon 12 comprising curable elastomer and then causes it to become elastomer layer 40 (which is the precursor to this liner) on expandable mandrel assembly 14.

In general, apparatus 10 serves the functions of ribbon presenting and forming for provision of the elastomer layer 40. The presenting function is carried out by ribbon issuing and applying device 16. The forming function is carried out by ribbon receiving and shaping device 18. Control 20 controls coordination and orientation of ribbon 12 between devices 16, 18. Control device 20 is programmed to carry out these coordination and orientation features substantially automatically after the initial set up.

Extruder 22 of ribbon issuing and applying device 16 in FIG. 1 extrudes thin, tacky ribbon 12 comprising curable elastomer from its elastomer supply stock 21. Tacky ribbon 12 proceeds through feed line 24 to applicator head 26 which carries applicator roller system 28. Applicator head 26 is for applying oriented ribbon 12 to expandable mandrel assembly 14 which rotates on forward and aft shafts 42, 44 about mandrel axis 30 during such application. Ribbon 12 issues from extruder 22 at a rate, for example, of between about 50 ft./minute and 250 ft./minute, about equal to the rate at which the surface of expandable bladder 80 of mandrel assembly 14 adjacently passes applicator roller system 28. Variations of this latter rate can control ribbon thickness. Temperature of ribbon 12 is controlled by a temperature control unit 25 which maintains and controls temperatures in extruder 22 and the forming dies 23 thereof.

Applicator head 26 is carried on application head platform 32 which, in turn, is carried on translator platform 34. Translator platform 34 is translatable along guide rails 36 for moving applicator head 26 parallel to mandrel axis 30. Alternatively ribbon receiving and shaping device 18 may be translated while devices 16, 22, 23, 24, 25 and 32 are fixed to the floor.

Applicator head 26 is translatable in an arc through rotation of applicator platform 34 in grooves (not shown) under wheel 38. Applicator roller system 28 of applicator head 26 is translatable by means of an air loaded piston (not shown) in the applicator head 26. The air loaded piston responds to pressure exerted as a result of the contours of expandable mandrel assembly 14 witnessed during movement along the aforementioned arc.

Ribbon issuing and applying device 16 is an adaptation of the Model 601 Orbitread® New Tire System which is commercially available from Tire Equipment, Inc., Buena Park, Calif., formerly AMF Corporation. The Model 601 system includes the applicator head platform 32, the extruder 22, the AMF HIPAC system 23 for forming ribbon 12 in precise manner, temperature control unit 25 and control 20, including AMF's Spin Sync Electronic System, for synchronization of devices 18, 22, 23, 26, 32 and 34. The translator platform 34 is an adaptation from both the basic filament winding process used in producing composite cases as practiced by Hercules Incorporated and from Roll Covering Machine (e.g., Series 2000). The former device provides for three axes of applicator head adjustment, viz. parallel and perpendicular to mandrel axis 30 and also in an arc parallel to the dome surfaces of the mandrel. The latter device provides for the first two of these adjustments. Ribbon receiving and shaping device 18 comprises a mandrel rotating device such as used in winding fiber composite cases with necessary modifications to provide synchronous coupling with the requirements of device 16. The motor which turns expandable mandrel assembly 14 about mandrel axis 30 is controlled by control system 20 of device 16. Device 18 may also be considered as a modification of Tire Equipment's Spin Station used in rotating a tire carcass and it is commercially available with the Orbitread® systems such as Models 510 and 601 from Tire Equipment.

The adaptations of devices 16 (including 34) and 18 include the embodiment in a single device means of precisely forming and applying tacky ribbon to a mandrel such as is used in building pressure vessels (e.g., rocket motor cases) in a wide range of diameters and lengths and further of forming such ribbon in variable thickness using a ribbon with minimum thickness, e.g., 0.035 centimeters. The complete device 16 supported on platform 34 is available from Tire Equipment as Model 608 stripwinder. Apparatus 10 in which device 18, rather than device 16, translates is available from Tire Equipment as Model 628A.

Exemplary disclosures in connection with mechanical linkages and electrical control and monitoring thereof suited for devices 16, 18 are in U.S. Pat. Nos. 3,843,482; 3,901,756; 4,062,716; 4,155,789 and 4,206,009, which are hereby incorporated herein for such disclosures. Still other disclosures are in trade brochures entitled "Orbitread 510 and 520 OTR Retreading Systems," copyright 1977 by AMF, "AMF Tire Equipment HIPAC System," copyright 1978 by AMF, "AMF New Tire Systems," copyright 1978 by AMF, AMF Spin Sync® Electronic System, copyright 1979 by AMF and "AMF Roll Covering Machine," copyright 1974 by AMF of 5741 Rostrada Avenue, Buena Park, Calif. 97204.

Figure 2:
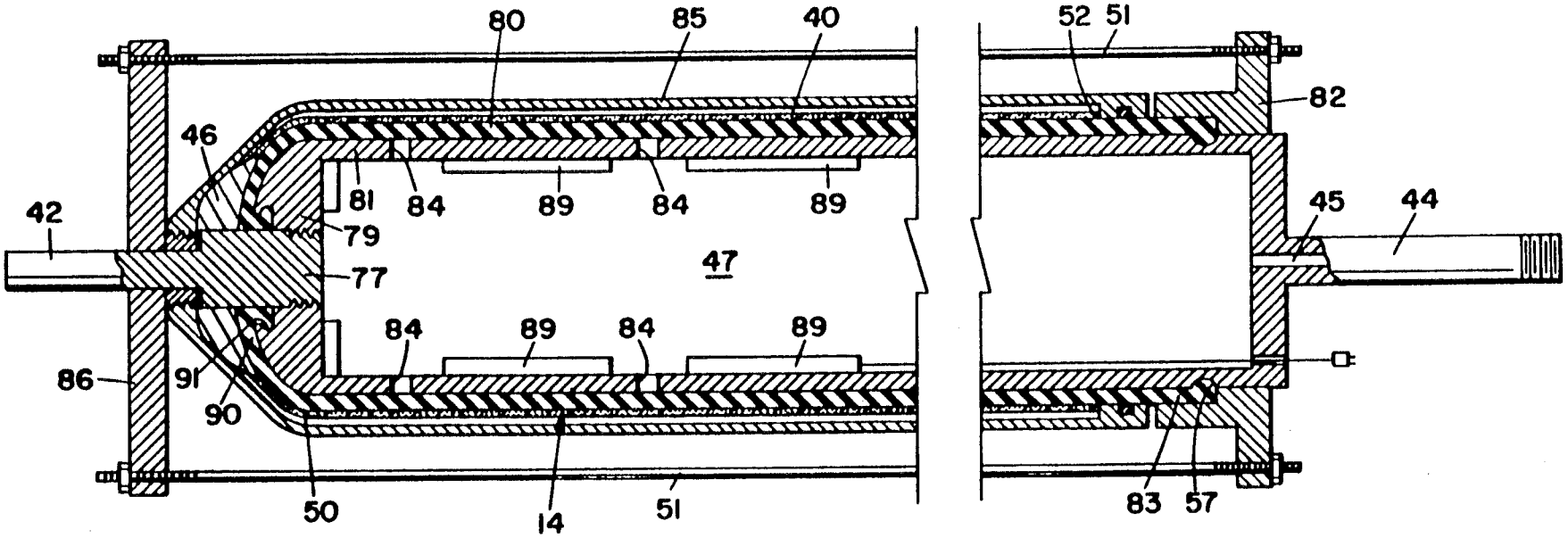
FIG. 2 depicts schematically an expandable mandrel assembly with applied elastomer installed in a rocket motor case and ready for expansion and vulcanization.

FIG. 2 is a schematic view in section of expandable mandrel assembly 14 having inflatable bladder 80 in the form of a cylindrical sleeve or tube mounted around mandrel body 81. Bladder 80 carries elastomer layer 40 that has been deposited on the surface of bladder 80 in practice of this invention. The mandrel assembly 14 and elastomer layer 40 are shown as they appear when inserted into rocket motor case 85. Elastomer layer 40 is a curable elastomer precursor layer to a liner of this invention in the first embodiment mentioned above. Elastomer 40 in FIG. 2 extends continuously from forward premolded elastomer cap 46 to aft terminal location 52 (or to an aft premold elastomer cap, not shown, as desired). The thickness of elastomer layer 40 is in accordance with insulator design for the rocket motor case.

Mandrel body 81 is rigidly mounted on forward and aft shafts 42, 44, for rotation of expandable mandrel assembly 14. Mandrel body 81 comprises a rigid metal cylindrical body integrated with rigid dome end 79. Forward shaft 42 carries retainer ring 86 which mounts tightly against rocket motor case shell 85 adjacent forward domed end 79 thereof for restraining shell 85 during expansion of mandrel assembly 14. Aft shaft 44 has conduit 45 leading to the hollow interior 47 of mandrel body 81 for purposes of evacuation or entry of pressured gas (e.g., nitrogen, steam, etc.) into mandrel assembly 14. Mandrel assembly 14, as noted previously, further comprises inflatable bladder 80, preferably made of silicone elastomer or other suitable material capable of expanding and holding pressures in the range between about 25 psig and 200 psig. Inflatable bladder 80 is in the form of a continuous hollow tube having its aft end 83 mounted in groove 87 circumferentially extending around mandrel body 81. Aft retaining ring 82 bolts to mandrel body 81 and tightly presses aft bladder end 83 in groove 87 in completing the seal of inflatable bladder 80 at its aft end 83 to mandrel body 81.

The forward bladder end 90 of inflatable bladder 80 is held in groove 91 of the forward dome end 79 of mandrel body 81. Shaft 42 threads into mandrel body 81 while enlarged shaft portion 77 acts to bind bladder forward end 90 against mandrel body 81 at its forward opening in sealing off bladder forward end 90. In addition, forward molded elastomer 46 mounts against inflatable bladder 80 on forward bladder end 90 in sealing off inflatable bladder 80.

Expandable mandrel assembly 14 further comprises gas pressure ports 84 and, optionally, heaters 89. Gas pressure ports 84 extend through mandrel body 81 to inflatable bladder 80. Pressurized gas entering port 45 in shaft 44 travels to the interior 47 of mandrel body 81 and through gas pressure ports 84 for inflation of inflatable bladder 80. Inflation of bladder 80 causes elastomer layer 40 to be forced against the interior of rocket motor case shell 85.

Inflatable bladder 80 has a thin, external coating of release material applied prior to applying elastomer layer 40. Alternately the inflatable bladder 80 is made of an inherent releasing material such as silicone rubber. Preferably, inflatable bladder 80 has a roughened surface that frictionally grips ribbon 12 (FIG. 1) as it lays upon bladder 80. The roughened surface typically has, however, a coating of standard release agent.

In applying elastomer layer 40 to inflatable bladder 80, a typical procedure is to begin at either at forward elastomer adaptor 46 and continue depositing ribbon 12 from there to the aft end 52 of mandrel assembly 14.

When a second dome shape is present it is covered with ribbon 12 starting at the other elastomer adaptor prior to covering the substantially cylindrical section of bladder 80. Then the substantially cylindrical section of bladder 80 between forward tangent location 50 and aft terminus (or aft tangent line) is covered with elastomer; this substantially cylindrical section, however, can be covered in whole or part with elastomer prior to covering either of the domes. Other sequences are possible and may be followed.

In covering a dome of inflatable bladder 80 with ribbon 12, the ribbon 12 is first attached to an elastomer adaptor such as 46 either directly or with the use of an adhesive. The elastomer adaptors 46, when used, may comprise cured or uncured elastomer. When the elastomer adaptor 46 comprises cured elastomer, bond to the uncured ribbon 12 can be assured by use of an elastomer adhesive material such as ChemLok® adhesive from Hughson Chemicals. Mandrel assembly 14 is then rotated as more ribbon is issued and layed on bladder 80 adjacent to elastomer adaptor 46.

Mandrel assembly 14 is inserted into rocket motor case after ribbon 12 has been applied to bladder 80 and adapter 46. Shaft 42 is then inserted into retaining ring 86. Retaining ring 86 has tie bars 51 which bolt around the periphery of ring 86 and bolt to aft retaining ring 82. Pressurized gas is then admitted through port 45 and heaters 89 activated. The heated, pressurized gas expands bladder 80 and raises its temperature for curing elastomer layer 40.

FIG. 3 further details cross-sections of the tacked ribbon segments making up elastomer layer 40, the ribbon cross-section being somewhat enlarged for illustration. Elastomer layer 40 has a thickness which varies between forward and aft terminals as can be seen in viewing FIG. 3. The thickness can vary from between greater than 25 centimeters to less than about 0.03 centimeters depending on the specific design.

FIG. 3 also depicts ribbon 12 layed on a dome and substantially cylindrical sections of inflatable bladder 80 by showing a cross-section of the resulting tacked segments thereof. Ribbon segments 54, 56, 58, 60, etc., lay substantially edgewise on the surface of expandable bladder 80. Ribbon segments 62, 64, 66, 68, etc., lay substantially flat on the surface of expandable bladder 80. The transition from substantially edgewise on the dome shape to substantially flat on this cylindrical section can be gradual as can be seen from FIG. 3. Applicator head 26 (FIG. 1) provides this orientation of segments 54, 56, 60, 62, 64, 66 and 68, etc., to mandrel assembly 14 as is discussed further in connection with FIGS. 4 and 5. Other ribbon orientations can be used in specific designs.

FIG. 4 schematically depicts a portion of apparatus 10 (FIG. 1) as it is used in applying ribbon 12 to a dome section 70 of inflatable bladder 80. FIG. 5 shows in a view of application roller system 28 (see, also, FIG. 1) as the rollers thereof apply ribbon 12 to a portion of this dome section.

Application head 26 of apparatus 10 in FIG. 4 can range between angles as much as 85° on either side of line 31 (which is perpendicular to axis 30) in applying ribbon 12 to the dome sections of inflatable bladder 80. Application roller 74 (of application roller system 28) is first positioned next to the apex dome section 70 in applying ribbon 12 thereto as shown in FIG. 4. The application of ribbon 12 to dome section 70 thus begins at the edge of forward premolded elastomer adaptor 46.

Mandrel assembly 14 continues to rotate about mandrel axis 30 as ribbon 12 is fed to applicator head 26 and applied to dome section 70 depicted in FIG. 4. Applicator head 26 translates in an arc about dome section 70 in applying ribbon 12 substantially circumferentially about mandrel axis 30 on this portion of bladder 80 in continuous fashion. Each segment of ribbon 12 encircling mandrel axis 30 lays on or adjacent the preceding segment and tacks with the next adjacent segment of ribbon 12 encircling mandrel axis 30 and laying on inflatable bladder 80. Air loading of applicator roller system 28 assists proper presentation of ribbon 12 to inflatable bladder 80.

Ribbon 12 has a rhomboid, trapezoid or other such cross-section thereby giving adjacently layed segments mating edges that can mate and tack together substantially circumferentially about the mandrel axis 30, as depicted in FIG. 3. After or prior to laying ribbon 12 on dome section 70, ribbon 12 is layed around the substantially cylindrical section of inflatable bladder 80. During this latter operation, head 26 of device 16 translates automatically along guide rails 36 (FIG. 1). Alternately the mandrel assembly 14 translates across head 26.

FIG. 5 is a view in elevation, partly developed, of the application of a portion of elastomer layer 40 to dome section 70 of FIG. 4. The applicator roller system 28 of FIG. 5 comprises orientation roller 74 and stitcher rollers 76, 78. (Alternately, stitcher roller 76, 78 may be omitted.) Orientation roller 74 urges ribbon 12 against mandrel dome 70 and stitcher rollers 76, 78 follow this application with pressure against the newly layed ribbon in a manner so as to reject entrapped air. This pressure tacks the newly layed ribbon to the previously layed ribbon segment substantially circumferentially around the center axis of dome 70 of the inflatable bladder 80 or to the cylinder section of inflatable bladder 80.

Figure 6:
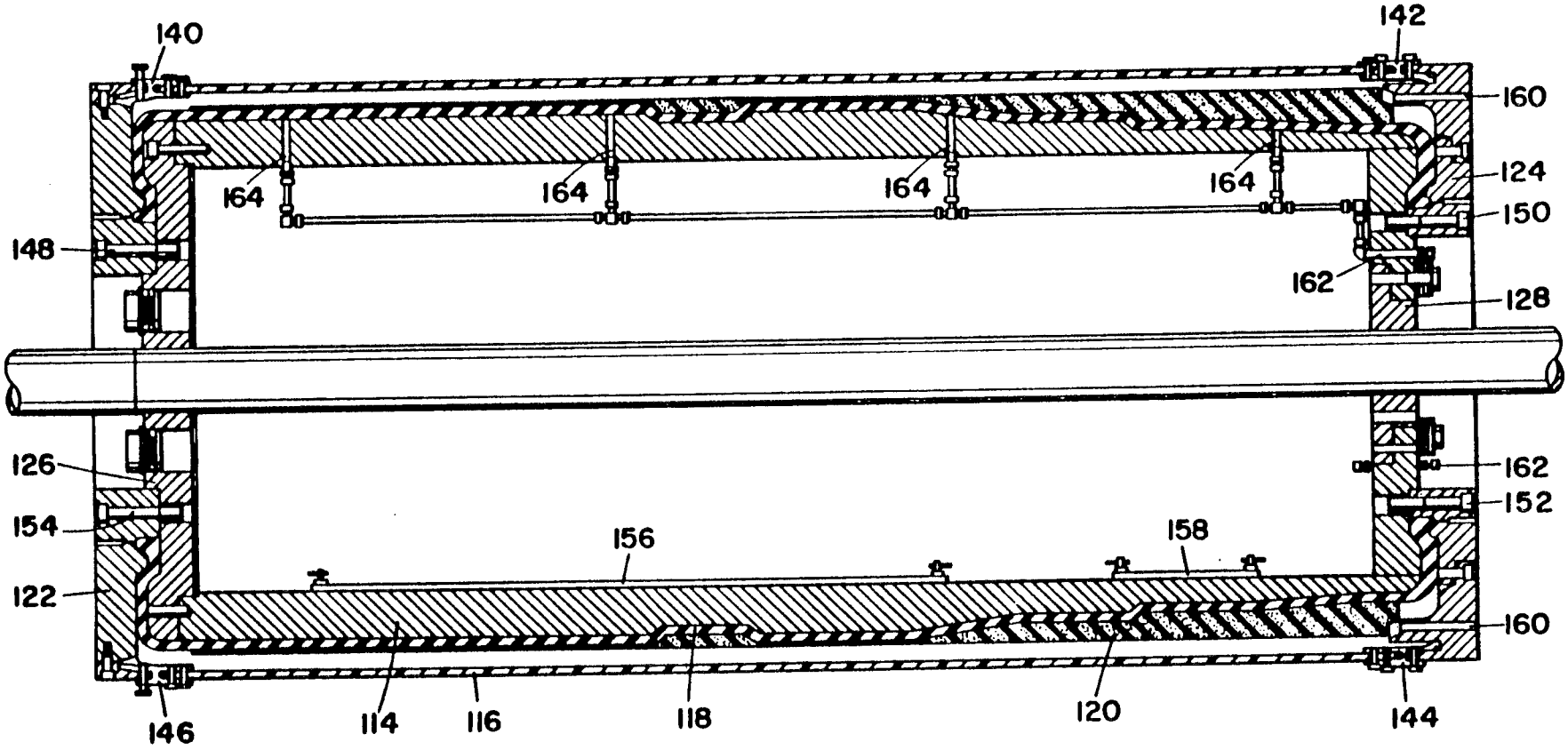
FIG. 6 depicts schematically an expandable mandrel assembly installed in a very large rocket motor case segment. A layer elastomer, wound around the expandable mandrel according to this invention, becomes, after expansion of the expandable mandrel, attached to the inside of the rocket motor case.
Figure 7:
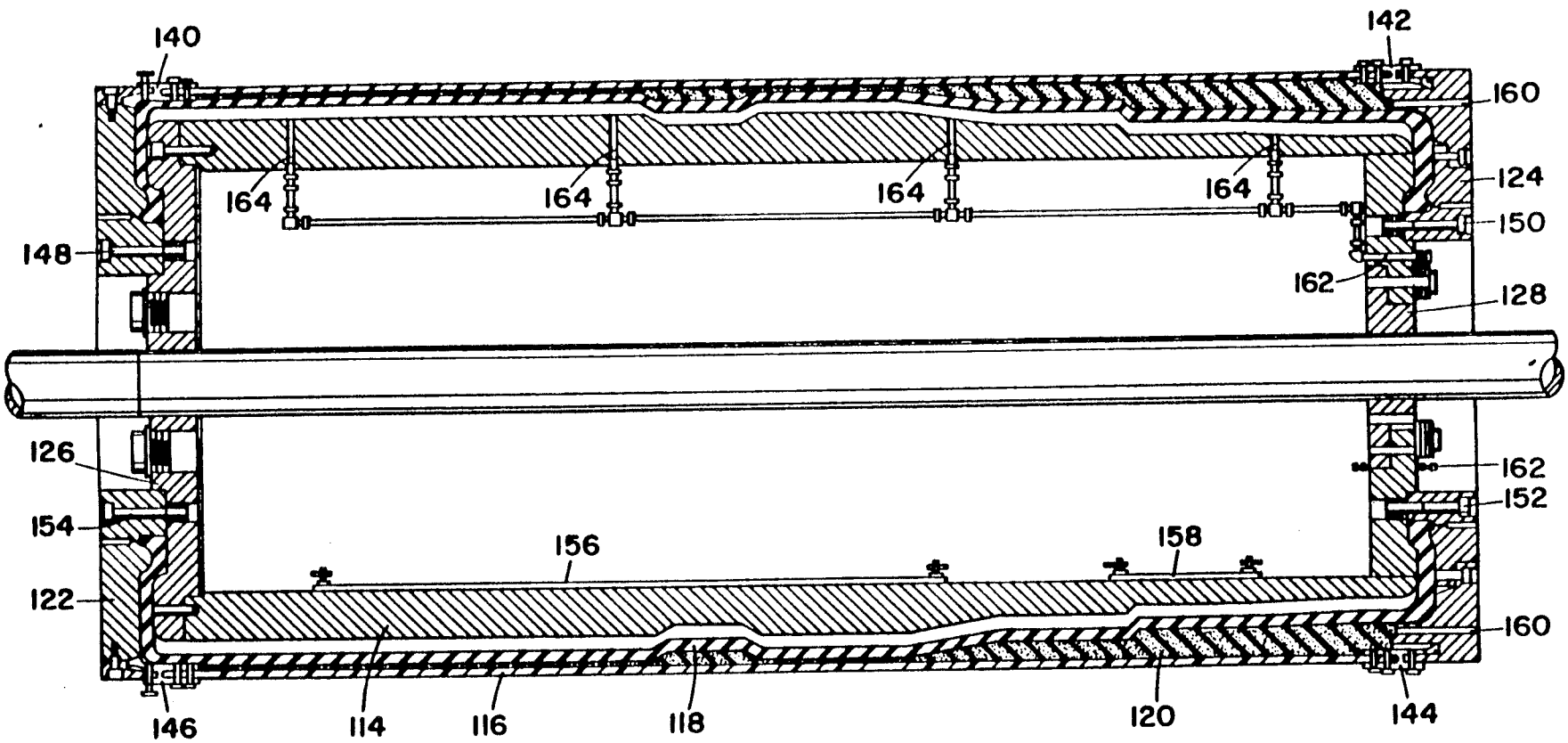
FIG. 7 depicts the insulator and expandable mandrel of FIG. 6 in fully expanded condition. The insulator carried by the expandable mandrel has been forced against the inside wall of the rocket motor case by mandrel expansion.
Figure 8:
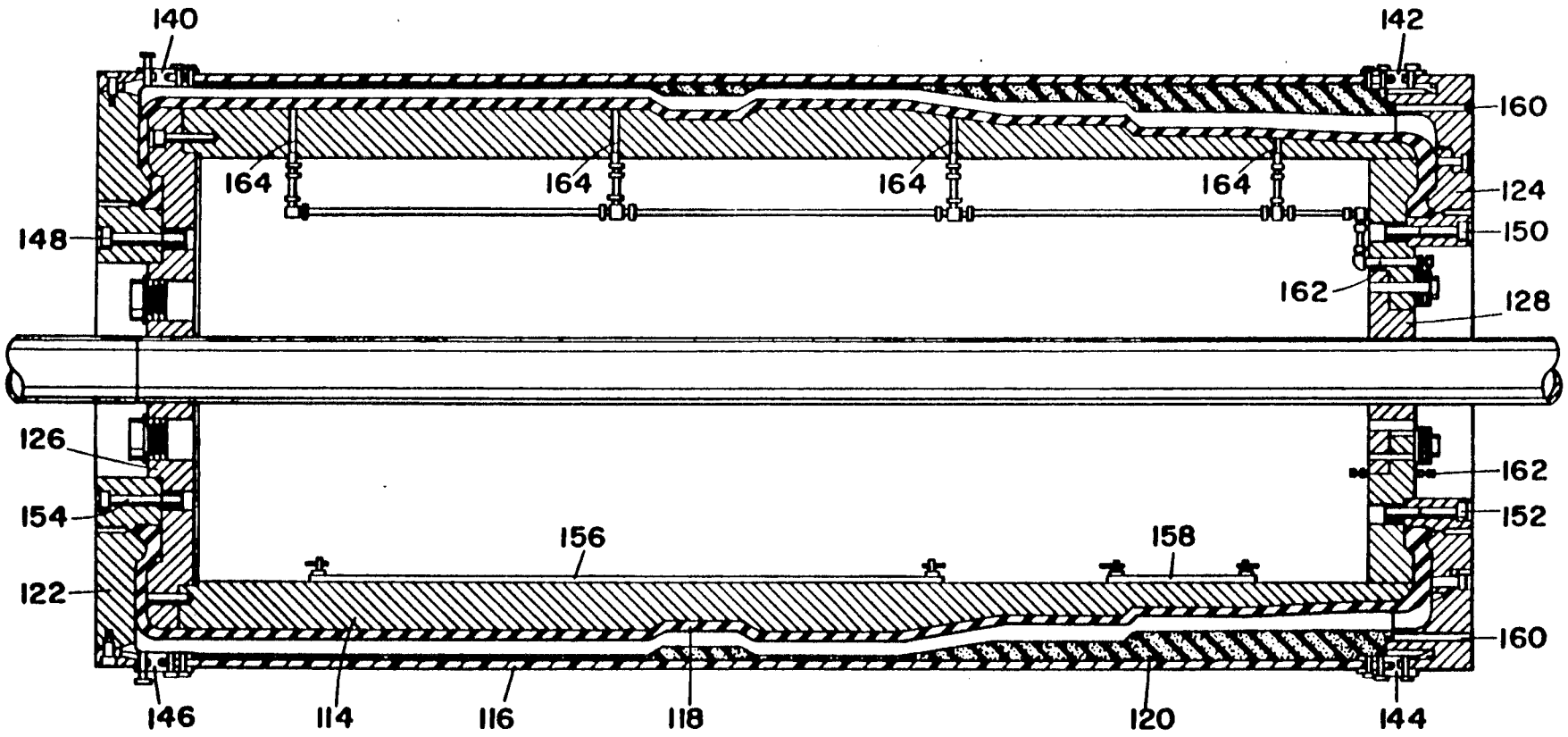
FIG. 8 depicts the insulator and expandable mandrel of FIG. 7 except the bladder of the expandable mandrel has retracted leaving the insulator bonded to the inside wall of the rocket motor case.

FIGS. 6, 7 and 8 relate to another practice of this invention and are schematic views in section of the expandable mandrel of this invention during various stages of lining the cylindrical segment 116 of a very large rocket motor with elastomer. FIGS. 6 and 7 show how the position of inflatable bladder 118 and elastomer layer 120 change in practice of this invention. FIG. 6 shows inflatable bladder in unexpanded condition. FIG. 7 shows expansion of inflatable bladder 118 such that elastomer layer 120 is forced against segment 116. FIG. 8 shows the deflation of bladder 118 with layer 120. The layer 120 (see FIG. 8) for this design comprises a cylindrical section of variable thickness and results from curing elastomer layer 120 (FIGS. 6 and 7).

In making elastomer layer 120, inflatable bladder 118 is positioned on mandrel core 114 in practicing this invention; then the thin tacky elastomeric ribbon is applied in the manner previously discussed to produce elastomer layer 120. Mandrel core 114 with the applied elastomer layer 120 is inserted into rocket case cylindrical segment 116 and positioned accurately. Prior to insertion, the layer 120 and the inside of case segment 116 are coated with an appropriate bonding aid to assure adhesion between the elastomer layer 120 and the inside surface of segment 116. Retaining ring clamps 122, 124 and end retainer caps 126 and 128 are positioned and locked into place once the expandable mandrel is inserted into segment 116. Retaining ring clamps 122, 124 are held in place by clevis fasteners 140, 142, 144 and 146. End plug pins 148, 150, 152 and 154 fasten ring clamps 122, 124 and end caps 126,128 to mandrel core 114.

Pins 148, 150, 152 and 154 may also be hollow and used for passage of heat transfer fluid into the interior of mandrel case 114. Alternatively, electric heaters such as 56, 158 may be spaced about the inside of mandrel core 114, may be used for applying heat to the mandrel core 114. A vacuum is applied to bleed holes provided at appropriate locations such as 160, 162 for inflation and deflation of bladder 80. Pressurization gas such as air or nitrogen is admitted through gas pressurization port 162 in an appropriate sequence and elastomer layer 120 is forced against inner wall of rocket case segment 116. (For small expandable mandrels the entire inner core may be pressurized as is typically done [see FIG. 2]). Pressurization is applied to inflatable bladder 80 through ports 164 in mandrel body 81. The use of ports 164 permits selective inflation of bladder 80. The gap between segment 116 and the unexpanded elastomer layer 120 is made as small as practical, e.g., 2–10 centimeters.

Pressure is preferably used to maintain elastomer layer 120 in contact with rocket case segment 116 during vulcanization; the preferred range of pressures is between 50 psig to 200 psig. Heat is applied to cure the elastomer. This is done by use of electric heaters 156 and 158, or alternatively (not shown) using (a) radiant heaters installed internally, (b) circulating an appropriate heat transfer fluid such as steam or hot oil in mandrel 114 (not shown), (c) using external heat as provided by an oven or autoclave, or (d) any appropriate combination of the preceding.

The ribbon as applied to a mandrel in practicing this invention is, as mentioned, tacky. In preferred embodiments the ribbon comprises curable elastomer. In other practice, however, the ribbon comprises cured elastomer.

For application of a ribbon consisting essentially of uncured elastomer in forming a liner, the following provides an outline of properties that are desirable in a preferred elastomer stock when using an extruder for its issuance:

1. Acceptable green strength so as to withstand application stresses;
2. Mooney viscosity typically between about 10 and 65 at 100° C.;
3. Extrudable without significant edge feathering;
4. Non-scorching during extrusion;
5. Sustainable tack;
6. Cure essentially void free preferably at low pressures and at temperatures below which damage may occur to the mandrel parts onto the vessel, including a curing composite shell, if employed. (e.g., Preferred temperatures are between about 250° F. and 350° F.; pressures between about 10 psig and 50 psig.)
7. Freedom or relative absence of oil-based plasticizers if to be used within rocket motor cases having propellants which absorb oil.

The tack of the elastomer is preferably inherent in the elastomer but may be accomplished through addition of a tackifier to the elastomer formulation providing the ribbon. In addition, or even in absence of such a tackifier, heat may be used to provide or enhance tack of the ribbon elastomer as it is being processed during its application by a temperature control unit or other means such as a heat tunnel positioned between the applicator and ribbon producing apparatus. Moreover, adhesive may be applied to the surface of the ribbon to provide or enhance its tack.

Tacking between adjacent segments is enhanced through the geometry of segments of the ribbon layed side by side. Such geometry includes rhomboid and trapezoid configurations. This tacking is further increased by mechanically urging the segments together through what is termed stitcher rollers 76, 78 of FIG. 5, or other means.

Although apparatus 10 in FIG. 1 utilizes an extruder for providing a ribbon comprising curable elastomer, other means for providing such a ribbon or other ribbons are also suited for use in this invention. For example, bias cloth tape, elastomer coated, available from Burlington Industries can also be employed where spools of such tape issue it to an application head, such as applicator head 26 in FIG. 1, through a heated tunnel to enhance tack thereof. Suitable cloths for the bias tape includes fabric such as graphite or Kevlar fabrics. The cloth is impregnated with elastomer, curable or cured, for this embodiment of the invention. A desirable range for the weight ratio of cloth to elastomer is where the elastomer weighs between about 75 and 125% of the cloth.

The ribbon of this invention may vary in thickness, cross-sectional geometry and width. Generally, ribbons having a constant thickness between about 0.02 and 0.025 centimeter are preferred for the aforementioned tapes while thicknesses of between 0.037 and 0.12 centimeter are preferred for the extruded ribbon. The width is preferably between about 0.1 and 5 centimeters and may vary depending on the configuration of the mandrel where it is layed.

The ribbon of this invention may be made of synthetic or natural rubbers which, in turn, may be filled with inorganic and/or organic fillers. Silica and organic flame retardants are examples of fillers.

The inflatable bladder may be fabricated using this invention. Any suitable elastomeric material may be used to fabricate the inflatable bladder depending on the needs of temperature and pressurization; two examples are chlorobutyl rubber and silicone rubber.

The following examples illustrate aspects of this invention in a more specific manner. The practices illustrated in the examples are not meant to limit this invention, but, rather, detail means for its particular application.

EXAMPLE 1

The following describes a practice of this invention using a production insulation bonding fixture used for producing 5 in. diameter rocket motors and an apparatus such as apparatus 10 depicted in FIG. 1. The apparatus was configured so that the mandrel rotating Device 18 also translated across applicator head 26. In this configuration devices 16, 22, 23, 24, 25 and 32 are fixed to the floor.

The insulator bonding fixture was positioned into the rotary device so as to be the mandrel assembly 14 of FIG. 4.

Premilled uncured elastomeric stock used in producing the rocket motor was formed into suitable physical dimension and fed to a 3½ inch diameter extruder. The extrudate was passed through a die unit and formed into a thin ribbon about 1¼ inch wide by 0.015 inch thick. The ribbon was applied to the rotating surface of the mandrel, such that the liner speed of the ribbon at the point of application was matched to the liner speed of the ribbon at the die system exit. No end caps or adaptors were used. Applied thickness at any point was controlled by varying such parameters as ribbon spacing (turns/inch), ribbon tension, ribbon thickness, rate of linear speed of the mandrel at the point of application to the linear speed of the ribbon at exit from the die system and angle of the ribbon to the surface of the mandrel. The above was accomplished using a modified roll covering machine produced by Tire Equipment.

The extrudate temperature was controlled to enhance tack of the elastomeric ribbon.

At the end of application an uncured elastomeric liner near design thickness dimensions, was present in the mandrel.

The mandrel covered with the dimensionally controlled liner precursor was inserted into and accurately positioned in a 5-inch diameter metal rocket motor case. The interior of the case was treated with a Krylon release material rather than the standard bonding agent used in production cases to permit subsequent removal of the cured insulator.

The assembly was placed in a thermal oven (vented autoclave). The insulator bonding fixture, similar to the mandrel shown in FIG. 2, was expanded by applying nitrogen pressure to provide contact between the elastomer and case interior wall. Heat was applied using the standard production cure cycle for the rocket motor insulator. After cure and cool down was complete, the insulator bonding fixture was removed. The insulator was removed, sectioned, and measurements taken along the length of the case. The cured thickness was compared to the uncured (green) thickness as tabulated in mils in Table A, below:

TABLE A

| | | | | | | | | | | | | | | | |
|---|---|---|---|---|---|---|---|---|---|---|---|---|---|---|---|
| | Forward | | | | | | | | Mid-Cylinder | | | | | | |
| Green | 25 | | 30 | | | | 30 | | 31 | 31 | | 31 | | | |
| Cured | 88* | 59 | | 28 | | 30 | | 30 | 30 | | 31 | 31 | | | |
| | Mid-Cylinder | | | | | | | | | Aft | | | | | |
| Green | 31 | | 31 | | 120 | | 110 | | 113 | | 112 | 155 | 155 | 151 | 90 |
| Cured | | 31 | | 31 | | 113 | | 107 | | 107 | 109 | 152 | 145 | 167* | |

*Increased thickness at ends by hand build up. Green (uncured) thickness values are machine applied.

EXAMPLE 2

Following the method of Example 1, a 7½ inch diameter mandrel consisting of a 7½ insulator bonding fixture was covered with the production thickness insulator stock. A dome shaped cured elastomeric cap was placed on the forward end of this unit and the extruded ribbon was wound against the premolded end cap. The assembly was then installed in a 7½ inch steel rocket motor case and shipped to the production facility for cure.

EXAMPLE 3

Using a machine similar to that shown in FIG. 1, but configured as in Example 1, and following the method of Examples 1 and 2, an insulator was applied to a nominal 7½ inch diameter mandrel. The time required was only 3 min. 15 sec. compared to approximately two hours for the standard process. The mandrel covered with insulation was inserted into a standard 7½ inch diameter steel rocket motor case which had been coated on the inside with Teflon to assure release of the insulator following cure. The bladder of the mandrel was inflated to assure contact of the wrapped insulation with the wall of the case; the insulator was cured in an oven following standard manufacturing cure cycle.

The cured insulation was removed from the Teflon-coated case, dissected, and inspected. All build-up was found to be within tolerance requirements except for a small region at the aft end where thickness was 0.020 inch below requirement.

EXAMPLE 4

Following the methods of Examples 1 and 3 a Teflon-lined case was insulated with R-184 fiber-filled elastomeric insulator material. The cured insulator was removed, inspected and found acceptable for use. Samples cut from the insulator were physically tested with the results shown in Table B, below:

TABLE B

| | Perpendicular to Fiber | | Parallel to Fiber | |
|---|---|---|---|---|
| | Tensile Strength psi | Elongation % | Tensile Strength psi | Elongation % |
| Min. value found | 977 | 300 | 1067 | 20 |
| Specification min. MIL-I-85491 | 820 | 250 | 1000 | Not Required |

EXAMPLE 5

Three 7½ inch diameter steel rocket motor cases were prepared for bonding insulation to the interior walls using standard manufacturing procedures; then insulation was installed in each case following the method of Example 3. After cure the insulation of each case was dimensionally checked to assure conformance to requirements. Two of the cases were selected for integration into the ongoing program for normal processing. The cases were loaded with propellant then assembled into rocket motors.

The motors were statically fired, one at −65° F. and one at +145° F. After firing the insulation remaining was measured and found to have performed acceptably.

EXAMPLE 6

Following the method of Example 5 an rocket motor case was insulated with rubber insulator material, propellant loaded and test fired. The insulation remaining after firing was found to have performed equally or better than insulation applied by hand.

What I claim and desire to protect by Letters Patent is:

1. A method of lining a small rocket motor case with elastomer, said method comprising:
   a. providing a shell for said case, said shell having a configuration including that of a cylinder;
   b. providing a mandrel having a central axis and enclosed at least in part with an inflatable bladder, said mandrel and bladder adapted to fit within said shell;
   c. providing an applicator for applying a thin, tacky ribbon that is continuous and comprises elastomer to the outer surface of said bladder;
   d. affixing said ribbon to a first surface portion of said bladder;

e. causing relative rotation between said mandrel and said applicator around said central axis while moving said applicator along said central axis so as to adjacently position and tack together integral segments of said ribbon in geometric mating relation on the surface of said bladder whereby a layer of said elastomer is formed around said bladder, said layer of elastomer having dimensions generally corresponding to those required for the liner or portion thereof of said vessel;

f. placing within said shell said mandrel and said bladder having said layer of elastomer;

g. expanding said bladder by introducing pressurized gas to the inside of said mandrel so as to cause said layer of elastomer to contact the inside of said shell and to bond said shell together with said layer of elastomer as the liner or portion thereof for said case;

h. withdrawing said bladder from said layer of elastomer bonded to said shell;

i. withdrawing said mandrel and said bladder from the inside of said shell.

2. The method in accordance with claim 1, wherein said ribbon comprises curable elastomer.

3. The method in accordance with claim 1, wherein said curable elastomer is cured by heating said mandrel after expanding said bladder.

4. The method in accordance with claim 1, wherein the diameter of said rocket motor case is between about 5 and 50 cm.

5. The method in accordance with claim 1, wherein said bladder is expanded by means including creating a vacuum between said shell and said bladder having said elastomer layer.

6. The method in accordance with claim 1, wherein said ribbon comprises cured elastomer.

7. A method of lining a small rocket motor case with elastomer, said method comprising:

a. providing a shell for said rocket motor case, said shell having a configuration including that of a dome shape;

b. providing a mandrel having a central axis and a dome shape, said central axis extending through the apex of said dome shape;

c. providing an inflatable mandrel that encloses said mandrel including around a portion of said dome shape;

d. providing an applicator for applying a thin, tacky ribbon that is continuous to the outer surface of said bladder;

e. affixing said ribbon to a first surface portion of said bladder;

f. causing relative rotation between said applicator and said mandrel about said central axis while moving said applicator along said central axis so as to adjacently position and tack together integral segments of said ribbon on said mandrel whereby a layer of said elastomer is formed around said bladder, said layer of elastomer having dimensions after cure substantially corresponding to those of the liner or portion thereof of said case;

g. placing within said shell said mandrel and said bladder having said layer;

h. expanding said bladder by introducing pressurized fluid to the inside of said mandrel so as to cause said layer to elastomer to contact the inside of said shell and bond said layer of elastomer and shell together;

i. curing said layer of elastomer;

j. withdrawing said bladder from said layer of elastomer bonded to said shell;

k. withdrawing said mandrel and said bladder from said shell.

8. The method in accordance with claim 7, wherein said mandrel comprises a dome structure and said central axis extends through the apex of said dome structure.

9. The method in accordance with claim 8, wherein there is an adapter which fits around the apex, said bladder enclosing said adapter as well.

* * * * *